United States Patent [19]
Shloss et al.

[11] Patent Number: 5,425,032
[45] Date of Patent: Jun. 13, 1995

[54] TDMA NETWORK AND PROTOCOL FOR READER-TRANSPONDER COMMUNICATIONS AND METHOD

[75] Inventors: Peter D. Shloss, Long Beach; Michael S. Friedman, Irvine; Dale R. Feikema, Chinho Hills, all of Calif.

[73] Assignee: Hughes Aircraft Company, Los Angeles, Calif.

[21] Appl. No.: 194,674

[22] Filed: Feb. 10, 1994

Related U.S. Application Data

[62] Division of Ser. No. 864,703, Apr. 7, 1992, Pat. No. 5,307,349.

[51] Int. Cl.6 .......................... H04J 3/16; H04B 7/212
[52] U.S. Cl. .................... 370/95.2; 370/95.3; 340/825.54; 455/55.1
[58] Field of Search ............... 370/85.1, 85.2, 85.3, 370/85.7, 85.8, 94.1, 95.1, 95.2, 95.3, 104.1; 340/825.06, 825.07, 825.08, 825.54; 455/53.1, 54.1, 54.2, 55.1

[56] References Cited
U.S. PATENT DOCUMENTS

| | | | |
|---|---|---|---|
| 4,466,001 | 8/1984 | Moore et al. | 340/825.08 |
| 4,642,806 | 2/1987 | Hewitt et al. | 370/104.1 |
| 4,736,371 | 4/1988 | Tejima et al. | 370/95.3 |
| 4,742,512 | 5/1988 | Ahashi et al. | 370/95.3 |
| 4,940,974 | 7/1990 | Sojka | 370/95.2 |
| 5,134,615 | 7/1992 | Freeburg et al. | 370/95.3 |
| 5,172,375 | 12/1992 | Kou | 370/95.3 |

Primary Examiner—Alpus Hsu
Attorney, Agent, or Firm—W. K. Denson-Low

[57] ABSTRACT

A TDMA network for reader-transponder communications including a receiver having an antenna for receiving and transforming radiated energy to a first RF signal and a detector for demodulating and converting the first RF signal to a digital signal. A protocol logic device is provided for decoding the digital signal and for executing a protocol. The protocol comprises a plurality of randomly selected time slots to gain admission to the TDMA network and a plurality of assigned time slots to transmit messages during the reader-transponder communications. In a transponder implementation, an oscillator is provided for converting protocol formatted digital signals from the logic device to a second RF signal. Thereafter, the antenna transforms the second RF signal to radiated energy and transmits the radiated energy. In a preferred embodiment, the TDMA network includes a transmit/receive switch for directing the first and second RF signals along the receive and transmit paths, respectively. A digital memory which communicates with the protocol logic device is provided for storing data unique to a transponder. The protocol also includes a reader control message time slot for interrogating the transponder and an acknowledgment time slot for indicating the reception of a message.

23 Claims, 5 Drawing Sheets

TDMA NETWORK AND PROTOCOL FOR READER-TRANSPONDER COMMUNICATIONS AND METHOD

This is a continuation of application Ser. No. 864,703, filed Apr. 7, 1992, now U.S. Pat. No. 5,307,349.

BACKGROUND OF THE INVENTION

1. Field of the Invention

The present invention relates to communication networks. More specifically, the present invention relates to methods and apparatus for Time Division Multiple Access (TDMA) communication network protocols.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Communications systems employed for short range communications between a reader transponder and a vehicle transponder are known in the art. Existing communications systems employed to communicate with and identify specific vehicles at certain locations require an antenna to be positioned in each traffic lane of the roadway. Each of the antennas are either connected to a dedicated roadside reader transponder or are multiplexed to a single reader transponder. These systems are designed to communicate with only a single vehicle per traffic lane and then only if the lane is equipped with an antenna. Further, the existing systems require each vehicle to slow down or stop, or to remain in a particular traffic lane during the identification process of the vehicle.

An example of a single traffic lane communications system known in the art includes a roadside reader transponder and a vehicle transponder. The system employs lane side or overhead antennas in each traffic lane and exhibits a read-only capability. The reader transponder senses the presence of the vehicle either by sending a periodically transmitted RF signal or by employing a vehicle sensor. Next, the reader transponder transmits an unmodulated carrier wave to the vehicle transponder. The carrier wave is a high frequency RF signal, e.g., a tone. If the unmodulated carrier wave is of the proper frequency and exceeds a threshold power level, the vehicle transponder responds by modulating the carrier wave. Thereafter, the method of modulated backscatter know in the art is employed in the vehicle transponder to transmit 128 bits of information back to the reader transponder.

The RF trigger signal must be controlled in order for this system to function properly. Additionally, the vehicles being monitored must slow down or stop and only a single vehicle per traffic lane can be monitored at any time. Further, barriers must be erected between traffic lanes to control the field of the RF trigger signal. If two vehicles each equipped with a transponder are in range of the RF trigger signal, each transponder will respond. This situation results in destructive interference of the two response signals. The interference is caused by the two response signals, one from each vehicle transponder, returning to the reader transponder simultaneously. The two signals become superimposed resulting in ambiguity in the received information which can be, for example, the identification of each of the vehicles.

A second example of a known communications system also includes a reader transponder and a vehicle transponder. This second communications system employs in-pavement antennas in each traffic lane and utilizes a transmitted RF trigger signal or vehicle sensor to detect the presence of the vehicle. If the RF trigger signal transmitted by the reader transponder satisfies the frequency and threshold power level requirements, the vehicle transponder responds with an identification message. Although the data capacity is comparable to that of the first communications system example described above, the data rate is much higher. This second communications system example is also prone to destructive interference when multiple signals are returned from more than one vehicle transponder. When the signals are superimposed, the response becomes garbled and senseless.

Clearly, both of these communications systems have shortcomings associated therewith. The infrastructure costs are high since many additional components (such as antennas, transceivers, barriers, etc.) are required to support the system. The restrictions on traffic flow (such as the requirements to slow down or stop, or to remain in the same traffic lane) are burdensome. Further, the reliability of the system is reduced during high traffic density periods or when vehicles straddle a traffic lane. Additionally, the read-only capability limits the prior art communications systems to toll collection applications. Unfortunately, read-write and broadcast capabilities are not available in these conventional systems.

Two TDMA communication network protocols known in the art are the plain aloha/pure slotted aloha scheme and the fixed slotted assignment scheme. In the plain aloha scheme, users of the network transmit messages at randomly selected time intervals. When few messages are being transmitted, all of the messages are successfully received. However, as the number of users increases, the messages tend to overlap and interfere with one another. In the pure slotted aloha TDMA scheme, users pick time slots at random in each frame. The selection of the time slots and the transmission of the data is controlled by the software within a modem. In the slotted aloha scheme, the message transmission can occur only within a specified time slot and is not permitted to straddle a time slot. If two users select the same time slot, the signals will collide and both messages are lost. Thereafter, users continue to select time slots until successful communication is achieved. When the network is employed to monitor vehicles on a freeway, the data throughput becomes excessive and the slotted aloha scheme becomes undesirable.

An alternative TDMA communication network protocol is the fixed slot assignment scheme. A modem is designed to implement a specific protocol and in this protocol, specific time slots are fixed for specific users. Therefore, the modem transmits data in fixed slot assignments for the specific users. However, the fixed slot assignment protocol becomes very inefficient when slots must be reserved for a large number of potentially infrequent users. Once a vehicle has passed a roadside reader transponder, a slot reservation for that vehicle need no longer be retained. However, difficultly arises in predicting when a particular vehicle will return to communicate with the reader transponder.

Thus, there is a need in the art for improvements in TDMA communication network protocols and the transponders associated therewith.

SUMMARY OF THE INVENTION

The need in the art is addressed by the TDMA network and protocol for reader-transponder communications and method of the present invention. The invention includes a receiver having an antenna for receiving and transforming radiated energy to a first RF signal and a detector for demodulating and converting the first RF signal to a digital signal. A protocol logic device is provided for decoding the digital signal and for executing a protocol. The protocol comprises a plurality of randomly selected time slots to gain admission to a TDMA network and a plurality of assigned time slots to transmit messages during the reader-transponder communications. In a transpounder implementation, an oscillator is provided for converting protocol formatted digital signals from the logic device to a second RF signal. Thereafter, the antenna transforms the second RF signal to radiated energy and transmits the radiated energy.

In a preferred embodiment, the TDMA network includes a transmit/receive switch for directing the first and second RF signals along the receive and transmit paths, respectively. A digital memory which communicates with the protocol logic device is provided for storing data unique to a transponder. The protocol also includes a reader control message time slot for interrogating the transponder and an acknowledgment time slot for indicating the reception of a message.

BRIEF DESCRIPTION OF THE DRAWINGS

FIG. 6 is a more detailed graphical illustration of the command field present in the reader control message of FIG. 4a.

DESCRIPTION OF THE INVENTION

Figure 1:
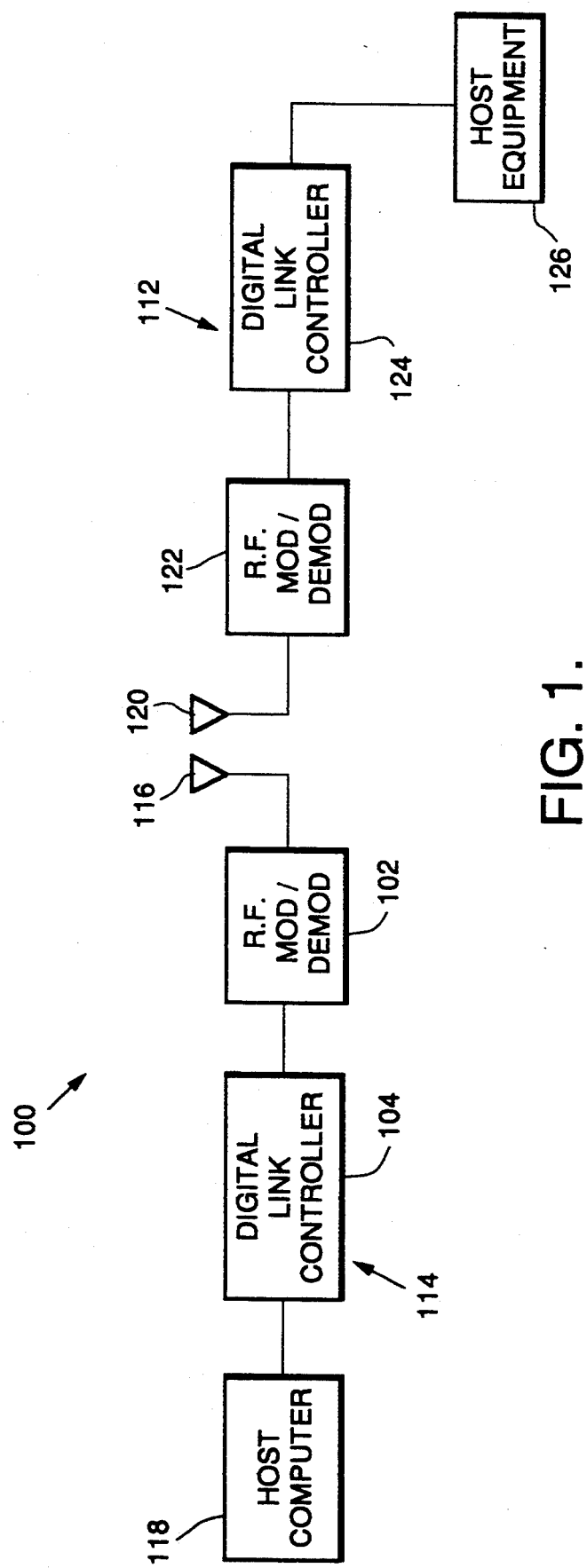
FIG. 1 is a simplified block diagram of an illustrative embodiment of the TDMA network of the present invention showing a vehicle transponder and a reader transponder.

The invention is embodied in a TDMA network 100 of the type used in reader-transponder communications having an RF modulation/demodulation section 102 for modulating, demodulating and converting signals between an analog and digital format and a digital link controller 104 for decoding messages and providing a protocol structure to the reader-transponder communications as shown in FIG. 1.

Figure 2:
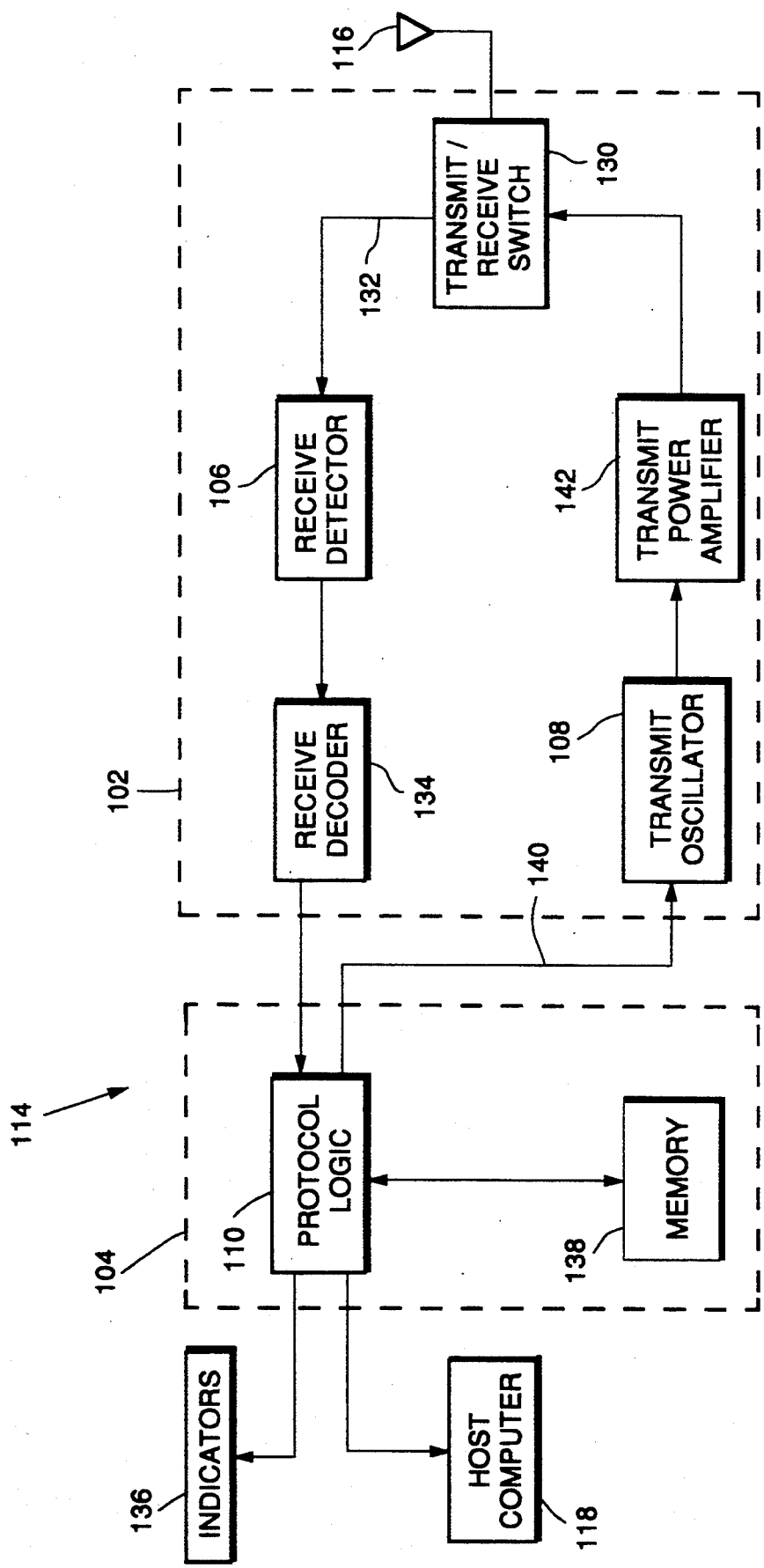
FIG. 2 is a more detailed block diagram of the vehicle transponder shown in the TDMA network of FIG. 1 and illustrating a digital link controller and an RF modulation/demodulation section.

Generally, a receive detector 106 and a transmit oscillator 108 of the RF modulation/demodulation section 102 cooperate with a protocol logic device 110 of the digital link controller 104 shown in FIG. 2 to substantially simplify the process of identifying vehicles on a roadway and to eliminate restrictions on traffic flow. These advantages are achieved by obviating the requirement of a per-lane antenna which permits reducing network infrastructure. Moreover, the protocol structure permits two-way communication between a reader 112 and a vehicle transponder 114, eliminates destructive interference of simultaneous response signals, and exhibits improved flexibility for extending the message structure to additional applications.

The invention includes a TDMA radio network which enables two-way data communications between the reader 112 and at least one vehicle transponder 114. As employed in the present invention, the reader 112 is usually a stationary transponder that can be positioned in any suitable location, for example, as part of the roadside infrastructure. However, the vehicle transponder 114 is usually mobile and passes within the range of the reader 112 to permit interrogation and identification of the vehicle transponder 114. In the present invention, the term vehicle is intended to have wide application and can include, for example, a motorized unit such as an automobile, a truck, a ship or boat, a transported cargo container or the like.

However, it is understood that many applications exist in which the reader 112 would be mobile and the transponder 114 would be stationary. An example of such an application is one in which the transponder 114 is housed in a container stored in a warehouse and the reader 112 is a mobile hand operated transponder. In this example, the interrogation and identification of the container and its contents is achieved by an individual carrying the reader 112. In the instant application, it is presumed for convenience that the reader 112 is a stationary roadside transponder and the vehicle transponder 114 is housed within a mobile vehicle.

In addition to the reader 112 and the vehicle transponder 114, the TDMA network includes a protocol that establishes the rules of communication. The protocol is designed for open road communication systems as opposed to single-lane communication systems. The advantage of open road communication systems is that a single roadside reader 112 can interrogate and identify vehicles in several traffic lanes without traffic restrictions, lane barriers, overhead structures and the like as has been the case in the past. Therefore the present invention is useful in many Intelligent Vehicle Highway Systems for applications such as electronic toll collection, route guidance (display), traveler information (broadcast), and commercial fleet tracking.

A simplified block diagram of the TDMA network 100 which discloses the reader 112 and the vehicle transponder 114 is shown in FIG. 1. The reader 112 and the vehicle transponder 114 each include a plurality of components which perform the same or similar functions. Therefore, those components of the reader 112 and vehicle transponder 114 which perform the same or similar functions will be described only once with any distinguishing features observed. The vehicle transponder 114 includes an antenna 116, the RF modulation/demodulation section 102 and the digital link controller 104. An optional host computer 118 is also shown. The reader 112 includes an antenna 120, an RF modulation/demodulation section 122, a digital link controller 124 and host equipment 126. The antenna 116 is integrally located within the transponder 114 and the antenna 120 is externally located to the reader 112. Further, each antenna 116 and 120 is utilized in a receive and transmit capacity. In the receive capacity, each antenna functions to receive and convert radiated energy to a first RF voltage signal. In the transmit capacity, each antenna serves to convert a second RF voltage signal to radiated energy.

The RF modulation/demodulation sections 102 and 122 of the transponder 114 and the reader 112, respectively, serve to demodulate the received (e.g., first) RF voltage signal (provided by the antennas 116 and 120, respectively) in the receive path as shown in FIG. 1. In the transmit path, the RF modulator/demodulator sections 102 and 122 serve to modulate the second RF voltage signal prior to being transmitted to the antennas 116 and 120, respectively. The digital link controllers 104 and 124, respectively, each include the protocol structure of the present invention and serve to execute the timing and decision making logic instructions.

The optional host computer 118 of the vehicle transponder 114 serves several functions. The host computer 118 can provide computer support and/or digital memory storage capacity to the protocol logic device 110 as shown in FIG. 2. Additionally, the host computer 118 can be employed to provide an interface to auxiliary devices (not shown) such as smart cards, digital displays or any data recording device. Further, the computer 118 can function to communicate with other computer peripherals such as the host equipment 126 shown connected to the digital link controller 124 of the reader 112 in FIG. 1. In such an arrangement, the vehicle transponder 114 and the reader 112 serve as modems to complete the communication link.

The operation of the vehicle transponder 114 will now be discussed with reference to FIG. 2. The radiated energy is received at the antenna 116 and converted to the first RF voltage signal. The first RF voltage signal is presented to a transmit/receive switch 130 located within the RF modulation/demodulation section 102. In the receive mode, the switch 130 routes the first RF voltage signal to the receive detector 106 in the receive path 132. The detector 106 demodulates the amplitude modulated carrier wave of the first RF voltage signal to provide a demodulated baseband (Manchester) split-phase coded signal. The detector provides an analog-to-digital (A/D) conversion. If the magnitude of the first RF voltage signal exceeds a specified threshold, the output signal is a logical one. If the specified threshold is not exceeded, the output signal from the detector 106 is a logical zero. The detector 106 can be for example, an envelope detector.

The demodulated baseband coded signal is then directed to a receive decoder 134 which converts the baseband signal to binary data bits. Further, the decoder 134 provides clock synchronization to the protocol logic device 110. The binary data bits, which form a message received from the reader 112, are then directed to the protocol logic device 110. The protocol logic device 110 decodes the binary data bits and executes the protocol structure which controls the timing and decision making logic instructions of the digital link controller 104. Examples of the decision making logic instructions include timing, message slot selection, memory input/output and transmit/receive control. A detailed discussion of the protocol structure of the present invention appears below in conjunction with FIGS. 4–6.

The protocol logic device 110 is shown in two-way communication with the host computer 118 in FIG. 2.

The host computer provides computer support and/or memory storage capacity to the protocol logic device 110 and serves as an interface to computer peripheral equipment. The protocol logic device 110 is also connected to a plurality of indicators 136 mounted on the vehicle transponder 114. The purpose of the indicators 136 is to signal the operator of the vehicle transponder 114 to perform some function, for example, to direct the vehicle to the roadway weigh station. The physical embodiment of the indicators 136 can include light emitting diodes, audio tones and the like.

Also shown connected in two-way communication with the protocol logic device 110 is a memory 138. The memory 138 is connected at the end of the receive path 132 within the digital link controller 104. The memory 138 provides long term storage of standard data for identifying the vehicle transponder 114 upon interrogation of the reader 112. Examples of the data stored in the memory 138 can include the vehicle type, registration number, vehicle identification number, operator identification and license number, vehicle weight, maximum load weight capacity, cargo information such as the bill of lading, ports of entry and the like.

In response to the message or interrogation from the reader 112, data provided by the host computer 118 or the memory 138 is formatted in the protocol logic device 110. The formatting procedure is in accordance with the protocol structure of the present invention. The protocol formatted digital data is then directed to the transmit oscillator 108 in the transmit path 140. The formatted digital data is utilized to modulate a transmit oscillator carrier wave to convert the data from a digital-to-analog (D/A) format. The output signal of the transmit oscillator 108 is the second (amplitude modulated) RF voltage signal. The second RF voltage signal is then directed to a transmit power amplifier 142 which boosts the signal level thereof. The second RF voltage signal is then transmitted to the transmit/receive switch 130. The transmit/receive switch 130, which is controlled by the protocol structure, routes the second RF voltage signal to the antenna 116. The antenna 116 then converts the second RF voltage signal to radiated energy which is thereafter transmitted to the reader 112.

The structural combination and operation of the reader 112 is very similar to that of the vehicle transponder 114 shown in FIG. 2. Only a few minor variations exist between the reader 112 and the transponder 114. Those variations include the absence of the indicators 136 and the memory 138 in the reader 112. The indicators 136 are not necessary since the reader 112 is not attended by an operator. Further, since the reader 112 performs the interrogation function on the vehicle transponder 114, a need for a depository of identification information in the reader 112 does not exist.

The reader 112 is the functional equivalent to the vehicle transponder 114 except that the corresponding element for the protocol logic device 110 in the reader 112 executes the portion of the protocol structure associated with the reader 112. In lieu of responding to interrogation as in the vehicle transponder 114, the protocol structure of the reader 112 is directed to the interrogation and control functions. Examples of the protocol structure of the reader 112 include generation of a reader control message each frame and assignment of message slots as will be discussed hereinbelow.

The protocol structure associated with the protocol logic device 110 shown in FIG. 2 will now be discussed. The network protocol employs a time division multiple access (TDMA) scheme in which various users are assigned specific time intervals in which to communicate. By taking turns, many users can share a single frequency channel. The present invention eliminates the need to isolate users, either physically or by using separate frequency assignments, to keep their respective communications from interfering with one another. The protocol structure of the present invention is illustrated in FIGS. 3-6.

Utilization of the TDMA network schemes of the past has proved unsatisfactory. The pure slotted aloha scheme based upon random selection becomes undesirable when the traffic density increases. Likewise, the fixed slot assignment scheme is very inefficient when slots are reserved for a large number of potentially infrequent users. A novel approach lies in the unique combination of slotted aloha and fixed slot protocols. The slotted aloha protocol provides random slots which are used as a means for vehicle transponders 114 to enter the TDMA communication network 100. The slotted aloha random slots are not used for communication of data.

Once an identification message from the vehicle transponder 114 is received and identified, the transponder 114 is assigned specific and unique time slots. Thereafter, data communication occurs between the reader 112 and the vehicle transponder 114 in the assigned time slots. Entry of a vehicle transponder 114 to the TDMA network 100 is not permitted during the assigned time slots. This protocol rule eliminates interference between response signals of different vehicle transponders 114 and ensures a very high data communication success rate between the reader 112 and the transponders 114. Further, an increased number of transponders 114 can be accommodated by the TDMA network 100 since message repeat time is minimized. This combination of time slots provides the best results for the following reasons. The random time slot selection is convenient for entry into the TDMA network 100 but is a poor choice for uniquely communicating with a large number of vehicle transponders 114. The assigned time slots are efficient for communicating among a known list of vehicle transponders 114 but entry into the TDMA network 100 by vehicle transponders 114 is difficult.

Figure 3:
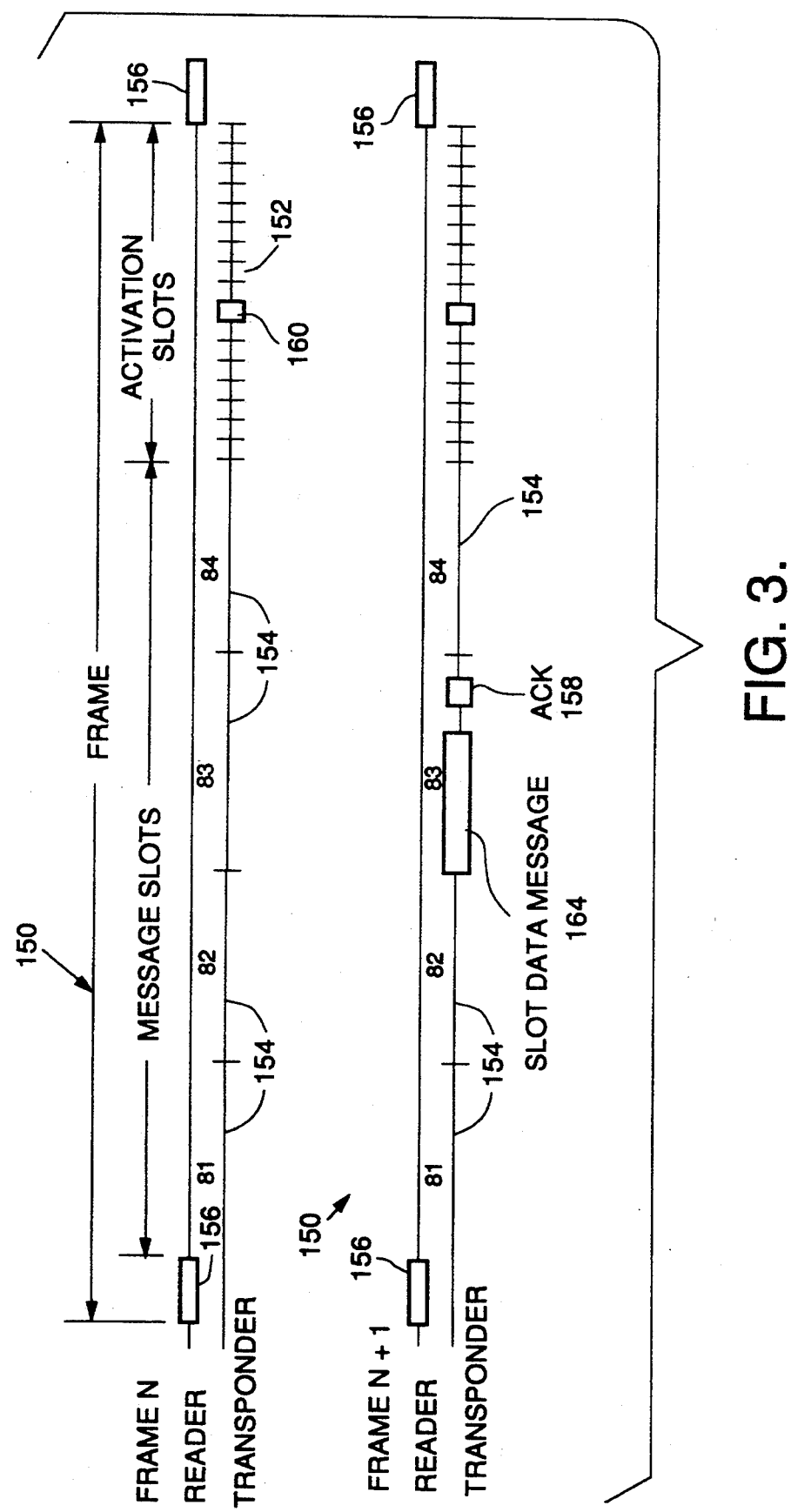
FIG. 3 is a graphical illustration of the protocol frame structure of the TDMA network of FIG. 1 showing adjacent frames N and N+1.

The protocol of the TDMA network 100 is optimized for short range, high data rate burst communications. Thus, the network 100 is optimized for non-continuous data communications within 100' at a rate of, for example, 500 Kbits/sec. Time is divided into repetitive frames 150 with each frame 150 containing two types of slots used by all network participants (e.g., vehicle transponders 114) as shown in FIG. 3. A different method of assignment is used for each type of time slot and protocol discipline is maintained by the reader 112. The first type of time slot is an activation slot 152 which is utilized by the vehicle transponders 114 to gain entry to the TDMA network 100. The vehicle transponders 114 select an activation time slot 152 at random and successfully contact the reader 112 if another vehicle transponder 114 does not select the same activation slot 152. Thereafter, the reader 112 assigns a message slot 154 to vehicle transponders 114 that have transmitted an identification message to the reader 112 and that identification message has been recognized. The message slots 154 are utilized for the transfer of data between the vehicle transponders 114 and the reader 112. The protocol reserves the message slot time to the particular vehicle transponder 114 to which the message slot 154 was assigned.

The reader 112 functions as a control unit and establishes the basic timing for the protocol. Time is divided into ten millisecond (10 msec) frames 150 which provides one-hundred frames per second. The protocol is represented by two adjacent frames 150 labeled N and N+1 in FIG. 3. At the beginning of each frame 150, the reader 112 transmits a reader control message 156 to the vehicle transponders 114. The reader control message 156 shown in FIG. 4a contains information relating to the assignment of message time slots 154 to vehicle transponders 114. The reader control message 156 also provides a timing reference from which all vehicle transponders 114 compute elapsed time. The remainder of the frame 150 is divided into the message slots 154 which are assigned to specific vehicle transponders 114 and activation slots 152 which can be employed by any vehicle transponder 114 attempting to gain entry to the TDMA network 100.

In the preferred embodiment, there are four message slots 154 (e.g., 81-84) and sixteen activation slots 152 as shown in FIG. 3. Each message slot 154 is bi-directional so that a message can be sent in either direction between the reader 112 and the vehicle transponder 114. A small acknowledge message time slot 158 is located within each message slot 154. The acknowledge message time slot 158 shown in FIG. 4d is utilized by the receiving transponder to signal the transmitting transponder of a successful reception of the message. Therefore, link validation and positive acknowledgement of data transactions is provided.

The two adjacent frames 150 labeled N and N+1 in FIG. 3 will now be utilized to describe the operation of the TDMA protocol. A mobile vehicle transponder 114 comes within range (e.g., enters the field) of the roadside reader 112. The reader 112 transmits and the vehicle transponder 114 receives a 224-bit reader control message 156 indicating the beginning of the frame 150 labeled N. At the end of the reader control message 156 in frame N, the vehicle transponder 114 waits a period of time equal to the time allocated to the four message slots 154. Thus, the frame 150 has advanced to the beginning of the activation time slots 152. Next, the vehicle transponder 114 randomly selects one of the sixteen activation time slots 152 and transmits a short transponder identification message 160 shown in FIG. 4b to the reader 112. The transponder identification message 160 contains a unique identification number used to gain access to the TDMA network 100. The unique transponder identification number is stored in the memory 138 of the vehicle transponder shown in FIG. 2.

The reader control message 156 of the next frame 150 labeled N+1 is monitored by the vehicle transponder 114. The purpose of the monitoring is to determine if the unique identification number of that transponder 114 appears among the identification numbers listed. If that unique identification number is listed in the reader control message 156 of frame N+1, then authorization is granted to use the corresponding message time slot 154 to transmit or receive a message. The vehicle transponder 114 is shown utilizing message slot 164 labeled 83 in FIG. 3.

If the unique identification number of the vehicle transponder 114 is not listed in the next reader control message 156, then the transponder 114 has not been assigned a message time slot 154. Examples of reasons why a message time slot 154 might not be assigned include the reader 112 did not receive the identification message 160 and identification number from the transponder 114, another transponder user selected the same activation time slot 152, a queue of more than four transponders 114 is awaiting the assignment of message slots 154, or the reader control message 156 was not clearly received by the transponder 114. Under these conditions, the transponder 114 selects another random time slot in the next activation slot 152, transmits another identification message 160 and repeats the procedure until a message slot 154 is assigned.

When an assignment of a message slot 154 is received, an eight-bit command field 162 in the reader control message 156 shown in FIG. 4a indicates to the vehicle transponder 114 whether it will transmit or receive the message. Either the reader 112 or the vehicle transponder 114 utilizes a slot TX/RX message 164 shown in FIG. 4c to communicate up to five-hundred twelve message bits of data. At the conclusion of the message shown in the slot TX/RX message 164 of FIG. 4c, the transponder receiving the message employs a positive acknowledge (Ack) message 158 shown in FIG. 4d to signal a successful reception to the transmitting transponder. If the slot TX/RX message 164 is not received correctly, a negative acknowledge (Ack) message is sent to the transmitting transponder.

If the reader 112 does not receive an acknowledge message 158 following a transmission made to a vehicle transponder 114, the reader 112 provides another opportunity to the transponder 114. This is achieved by the reader 112 scheduling another message slot 154 for that transponder 114. If a vehicle transponder 114 transmits a message to the reader 112 and fails to receive an acknowledge message 158, the transponder 114 attempts to contact the reader 112. Initially the transponder 114 seeks another message slot 154 to contact the reader 112. If another message slot 154 is not available, the transponder 114 attempts to contact the reader 112 through the entry process by utilizing the activation slots 152.

Message validity is provided by a cyclical redundancy code (CRC) checksum known in the art which is part of each message type. The message types include the reader control message 156, the transponder identification message 160, the slot TX/RX/message 164 and the acknowledge message 158. The checksum is computed using all the message fields except a header field 166 and a CRC field 168. In computing the checksum, a shift register with feedback taps (not shown) and an algorithm are used. An example of an algorithm suitable for use in data validity checks is a communications industry standard known as the CRC-16 algorithm. The last sixteen data bits clocked out of the shift register is the checksum. The checksum is then appended to the message by the transmitting transponder. The receiving transponder computes the checksum and compares it against the transmitted checksum. Any bit errors will cause the checksums to disagree. This procedure provides a reliable means of detecting faulty messages.

Concern exists that message communications can be intercepted and copied and thereafter utilized after admission to the TDMA network to avoid toll fares or to divert the automatic billing to another vehicle transponder 114. Therefore, integrity of the transmitted data in the slot TX/RX message 164 shown in FIG. 4c is enhanced by an anti-counterfeiting algorithm. A sixty-four bit seed field 170 is formed as part of the reader control message 156 shown in FIG. 4a. The reader 112 places a different value in the seed field 170 in each frame 150. Vehicle transponders 114 with slot assignments in that frame 150 will use the seed value in the seed field 170 as the starting point in the anti-counterfeiting algorithm. The algorithm is employed to compute a checksum using the message data. Two examples of algorithms known in the art and suitable for use as the anti-counterfeiting algorithm include the. Data Encryption Standard (DES) algorithm and the Riest, Shamir & Adleman (RSA) algorithm.

The checksum is included in a valid field 172 located in the slot TX/RX message 164 shown in FIG. 4c. The reader 112 can compute the checksum based upon the seed value in the seed field 170 and the received message data. The checksum computed by the reader 112 is then verified against the valid field 172 in the slot TX/RX message 164. The CRC algorithm utilized to verify error free transmission, does not offer anti-counterfeiting protection. Since the value of the seed field 170 is changed each frame 150, a message from a previous frame 150 will be detected and rejected by the anti-counterfeiting algorithm. This is the case since the seed value from a previous frame 150 will generate a different valid field 172 from that generated by the seed of the current frame 150. Additional message integrity schemes which disguise the actual message data through encryption are anticipated, particularly in the transmission of financial data.

Figure 4:
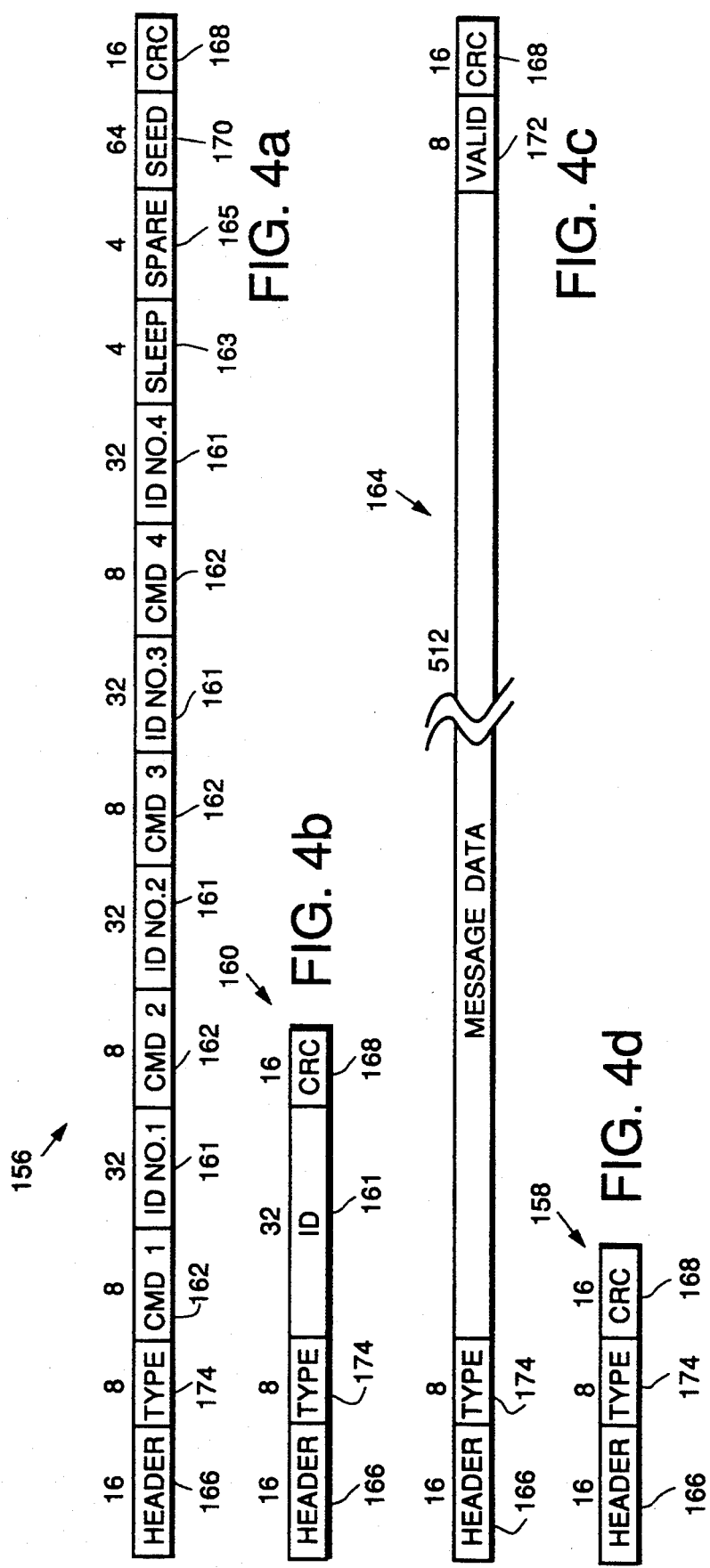
FIGS. 4a, 4b, 4c and 4d are graphical illustrations of the standardized message formats utilized by network participants including a reader control message, a transponder identification message, a slot transmit/receive message and an acknowledgment message, respectively.

Other bit fields shown in FIG. 4 include a thirty-two bit identification field 161 which is illustrated in both the reader control message 156 of FIG. 4a and the transponder identification message 160 of FIG. 4b. The bit identification field 161 includes identification information transmitted from the vehicle transponder 114 to the reader 112 during interrogation of the transponder 114. Additionally, a four bit sleep field 163 and a four bit spare field 165 are each included as shown in FIG. 4a.

Figure 5:
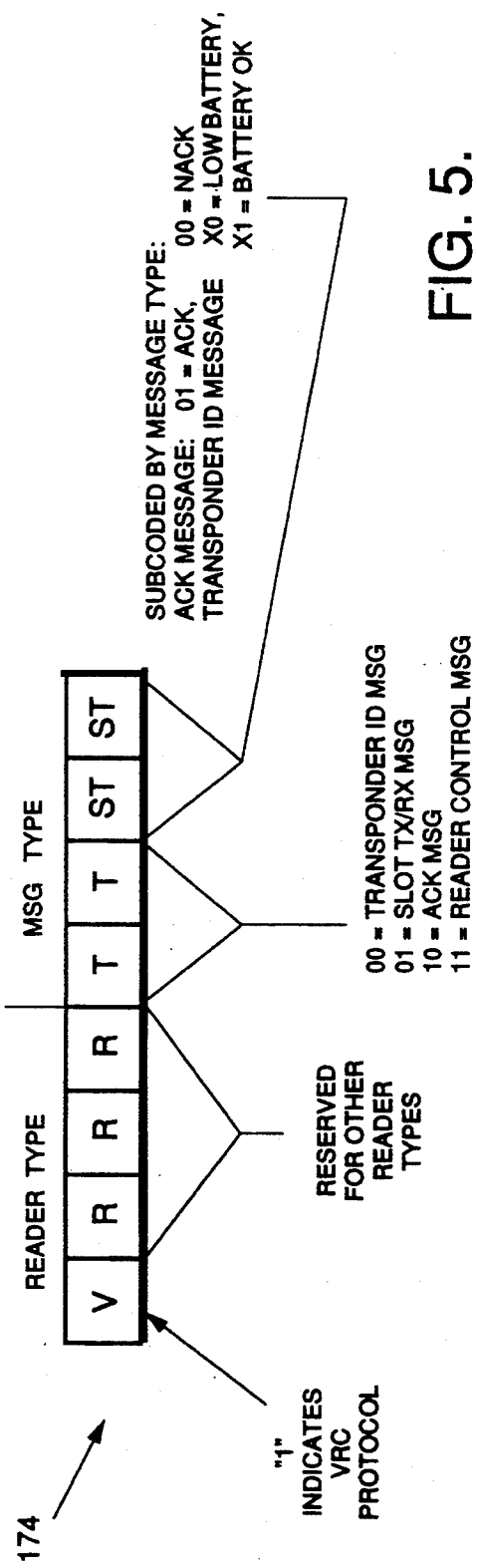
FIG. 5 is a more detailed graphical illustration of the type field present in each of the standardized message formats of FIGS. 4a, 4b, 4c and 4d.

An obvious application of the TDMA network 100 of the present invention is electronic toll collection. However, the TDMA protocol has been designed not to require new message types to support other applications beyond the specific example provided. At the beginning of every message is a type field 174 as shown in FIGS. 4 (a-d) and 5. The type field 174 indicates both the reader type and the message type. Referring to FIG. 5, it is noted that the reader type and the message type each include four blocks. Each slot is identified by a code letter. In identifying the reader type, each block includes either a "V" or an "R" code letter. If the numeral "1" appears in the "V" block, the protocol of the TDMA network 100 is being utilized. The code letter "R" appearing in the remaining three bits are reserved for a numeral which indicates another reader type.

In identifying the message type, two blocks include a "T" code letter and the two remaining blocks include "ST" code letters. Four binary combinations of "0" and "1" can appear in the two bits labeled "T". The combination "00" indicates that the message is a slot transponder identification message 160 and the combination "00" indicates that the message is a slot TX/RX message 164. The combination "10" indicates an acknowledge message 158 and the combination "11" indicates a reader control message 156. The remaining two bits which have the code letters "ST" indicate a message type subcode which uses one of four character combinations. When an acknowledge message 158 is indicated by the combination "10" the message type subcode "00" indicates a positive acknowledge message or "Ack"

while the subcode "00" indicates a negative acknowledge message or "Nack". When a transponder identification message 160 is indicated by the combination "00" the message type subcode "X0" indicates low transponder battery power while the subcode "X1" indicates that the transponder battery power is not of concern (e.g., the "X" indicates a "don't care").

The TDMA network 100 normally employs a roadside reader 112, however, other types of readers can be implemented. Restrictions are not placed upon the implementation of other protocols in order to enjoy the advantages of the TDMA structure of the present invention. The reader control message 156 will indicate the specific protocol employed and the initiation of the time of the frame 150. Vehicle transponders 114 can identify the exact protocol variation and participate in the communication, if desired. Thus, the present invention can be utilized to support a variety of specific intelligent vehicle highway system applications while employing a common set of equipment comprising vehicle transponders 114 and a reader 112.

Figure 6:
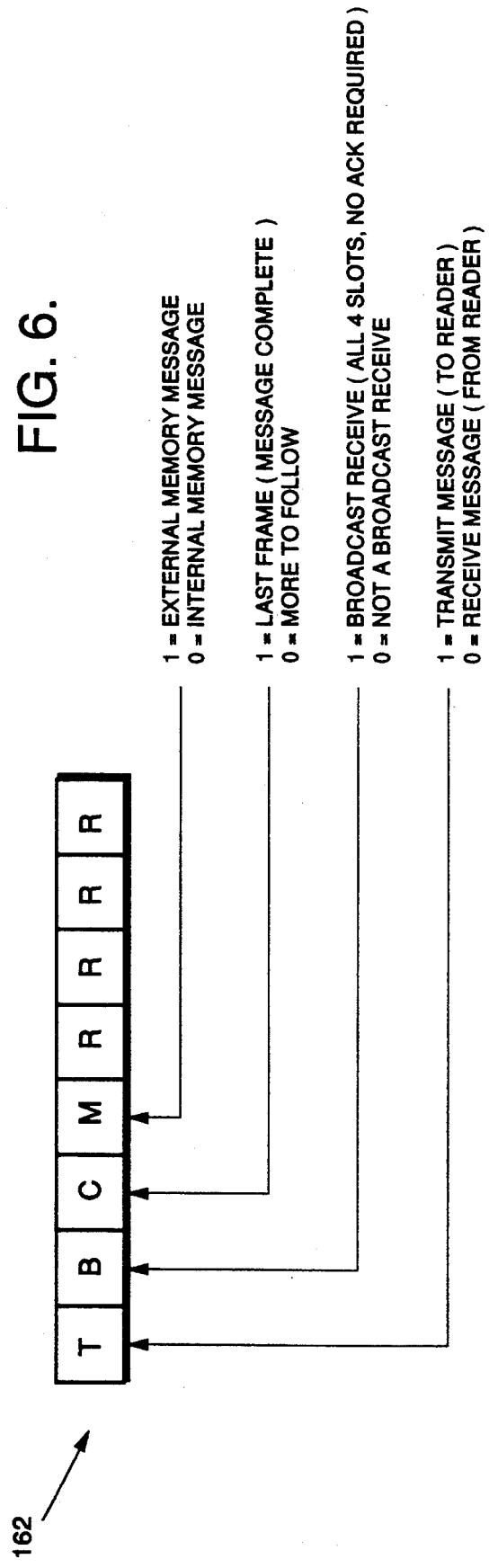

As a further example of flexibility, the command field 162 in the reader control message 156 can be expanded as shown in FIG. 6. The command field 162 includes eight bits identified by code letters. The reader 112 can instruct the vehicle transponder 114 to transmit or receive a message. Thus, a "1" located in the "T" bit instructs the transponder 114 to transmit a message to the reader 112 while a "0" in the "T" bit instructs the transponder 114 to receive a message from the reader 112. Further, the reader 112 can place the transponder 114 in a broadcast mode where the message is intended for all the vehicle transponders 114. A "1" in the "B" bit of the command field 162 places all the transponders 114 in the broadcast receive mode where all four bits are used and an acknowledge message 158 is not required. A "0" in the "B" bit indicates that the broadcast receive mode is not activated.

A message having too many characters to fit into a single message slot 154 shown in FIG. 3 can be transmitted in multiple slots. The use of multiple slots for a single message can be indicated by placing a "0" in the "C" bit of the command field 162 as shown in FIG. 6. This code indicates that there is more message to follow. A specific vehicle transponder 114 can be assigned all four message slots 154 in a single frame 150 or be assigned message slots 154 in different frames. If a "1" is placed in the "C" bit, the indication is that this frame 150 is the last frame of the message, e.g., the message is complete. Finally, the message can be intended for internal use only, such as in reprogramming parameters in the vehicle transponder 114. An internal memory message is indicated by placing a "0" in the "M" bit of the command field 162. However, the message can also be intended for external use such as when a vehicle transponder 114 passes a message to a human operator or a display screen used in a vehicle navigation system. Under these conditions, a "1" is placed in the "M" bit of the command field 162. The remainder of the bits in the command field 162 shown in FIG. 6 are labeled "R" which indicates that those bits are reserved for other uses.

The data rate is currently 500 Kbits/sec. Since the data rate, message length and frame rate are interdependent, the TDMA protocol can be operated at any desired data rate and frame rate. Further, the TDMA protocol is not radio frequency or modulation dependent.

The present invention employs a protocol structure within a TDMA network 100 which permits two-way communication of one or more five-hundred twelve bit packages in each direction between a reader 112 and at least one vehicle transponder 114. The invention simplifies the process of identifying vehicles on a roadway and permits every vehicle on the roadway to be identified by eliminating destructive interference of simultaneous response signals. These advantages are achieved by obviating the requirement of a per-lane antenna which reduces network infrastructure. Moreover, the protocol structure is designed to operate efficiently with vehicles traveling at one-hundred mph and spaced as closely as ten feet apart. By removing speed and lane restrictions, the invention reduces the impact to traffic flow and improves the reliability of the network under conditions of lane straddling. Two vehicles in a lane, such as motorcycles, can be reliably detected. The invention also exhibits improved flexibility for extending the message structure and protocol to additional applications such as read-only, read-write and broadcast modes. These additional applications can be implemented using the protocol of the present invention. Thus, a single vehicle transponder 114 can be used in a wide range of applications from toll collection (read-only) to commercial debit transactions (read-write) to highway advisory announcements (broadcast).

Thus, the present invention has been described herein with reference to a particular embodiment for a particular application. Those having ordinary skill in the art and access to the present teachings will recognize additional modifications, applications and embodiments within the scope thereof. Although the detailed description is directed to a stationary reader and a mobile transponder, the present invention is equally applicable to other embodiments in which the reader is mobile and the transponder is stationary as where a mobile reader is utilized to identify containers stored in a warehouse.

It is therefore intended by the appended claims to cover any and all such modifications, applications and embodiments within the scope of the present invention.

Accordingly,

What is claimed is:

1. A receiver for a TDMA communications network comprising:

means for receiving and transforming radiated energy to a first RF signal;

means for demodulating and converting said first RF signal to a digital signal; and logic means for decoding said digital signal and for executing a protocol, said protocol comprising a plurality of short, randomly selected activation time slots used only to gain admission to said TDMA network and wherein said randomly selected activation time slots are not used for communication of data messages, and a plurality of message time slots to transmit data messages during communications over said TDMA network, said message time slots being assigned to particular user transponders in response to user transponder identification signals received during said activation time slots, said message time slots being relatively long in relation to said activation time slots, and wherein said message slots cannot be used to gain admission to said TDMA network.

2. The receiver of claim 1 wherein said logic means comprises means for generating protocol formatted digital signals, said receiver further including oscillating means for converting said protocol formatted digital signals to a second RF signal.

3. The receiver of claim 2 further including means for transforming said second RF signal to radiated energy and for transmitting said radiated energy.

4. The receiver of claim 2 wherein said oscillating means for converting said digital signal to a second RF signal is a transmit oscillator.

5. The receiver of claim 3 wherein said means for transforming said second RF signal to radiated energy and for transmitting said radiated energy is a transmit antenna.

6. The receiver of claim 3 further including a switch for routing said second RF signal from said oscillating means to said transforming and transmitting means.

7. The receiver of claim 2 further including a power amplifier to amplify said second RF signal.

8. The receiver of claim 1 wherein said receiving and transforming means is a receive antenna.

9. The receiver of claim 1 wherein said demodulating and converting means is a detector.

10. The receiver of claim 9 further including a decoder for transforming said digital signal of said demodulating and converting means into data bits.

11. The receiver of claim 10 wherein said decoder provides clock synchronization to said logic means.

12. The receiver of claim 1 wherein said logic means for decoding said digital signal is a protocol logic device.

13. The receiver of claim 1 further including means for storing digital data for use in said TDMA network communications.

14. The receiver of claim 13 wherein said means for storing digital data is a digital memory.

15. The receiver of claim 13 wherein said means for storing digital data is a host digital computer.

16. The receiver of claim 1 further including a switch for routing said first RF signal from said receiving and transforming means to said demodulating and converting means.

17. The receiver of claim 1 further including an indicator device to provide signaling information at a transponder, said indicator device being controlled from said logic means.

18. A transponder for a TDMA communications network comprising:
   an antenna for receiving and transforming radiated energy to a first RF signal;
   a detector for demodulating and converting said first RF signal to a digital signal;
   a protocol logic device for decoding and digital signal and for executing a protocol, said protocol comprising a plurality of short, predetermined, randomly selected activation time slots to gain admission to said TDMA network, and wherein said activation time slots are not used for the communication of data messages, and a plurality of predetermined message time slots to transmit data messages during communications over said TDMA network, said message time slots being assigned to particular user transponders in response to user transponder identification signals received during said activation time slots, said message time slots being relatively long in relation to said activation time slots, and wherein said message time slots cannot be used to gain admission to said TDMA network; and
   and oscillator for converting protocol formatted digital signals from said logic device to a second RF signal wherein said antenna transforms said second RF signal to radiated energy and transmits said radiated energy.

19. A method for operating a TDMA network for reader-transponder communications, said method comprising the steps of:
   receiving and transforming radiated energy to a first RF signal;
   demodulating and converting said first RF signal to a digital signal;
   decoding said digital signal and executing a protocol, said protocol comprising a plurality of short, predetermined, randomly selected activation time slots to gain admission to said TDMA network and a plurality of predetermined message time slots to transmit data messages during communications over said TDMA network, said message time slots being assigned to particular user transponders in response to user transponder identification signals received during said activation time slots, said message time slots being relatively long in relation to said activation time slots, and wherein said message time slots cannot be used to gain admission to said TDMA network;
   formatting said decoded digital signal with said protocol and converting said formatted digital signal to a second RF signal;
   transforming said second RF signal to radiated energy; and
   transmitting said radiated energy.

20. The method of claim 19 wherein the step of demodulating and converting said first RF signal to a digital signal includes the steps of converting said first RF signal to a baseband signal and decoding said baseband signal to provide data bits.

21. The method of claim 19 wherein the step of converting said formatted digital signals to said second RF signal includes the step of modulating an oscillator carrier signal with said formatted digital signals.

22. The method of claim 19 further including the step of amplifying said second RF signals.

23. A transponder for a TDMA communications network comprising:
   an antenna for receiving and transforming radiated energy to a first RF signal;
   a detector demodulating and converting said first RF signal to a digital signal, said digital signal including an interrogation request from a reader device;
   a protocol logic device for decoding said digital signal and for executing a protocol in response to said interrogation request, said protocol comprising a plurality of short, predetermined, randomly selected activation time slots to gain admission to said TDMA network, and wherein said activation time slots are not used for the communication of data messages, and a plurality of predetermined message time slots to transmit data messages during communications over said TDMA network, said message time slots being assigned to particular user transponders in response to user transponder identification signals received during said activation time slots, said message time slots being relatively long in relation to said activation time slots, and wherein said message time slots cannot be used to gain admission to said TDMA network;
   means for converting protocol formatted digital signals generated by said logic device to a second RF signal wherein said antenna transforms said second RF signal to radiated and transmits said radiated energy.

* * * * *

Disclaimer 5,425,032—Peter D. Shloss, Long Beach; Michael S. Friedman, Irvine; Dale R. Feikema, Chino Hills, all of Calif. TDMA NETWORK AND PROTOCOL FOR READER-TRANSPONDER COMMUNICATIONS AND METHOD. Patent dated June 13, 1995. Disclaimer filed Oct. 28, 1996, by the assignee, Hughes Aircraft Company.

Hereby enters this disclaimer to the remaining term of said patent.
*(Official Gazette,* August 12, 1997)